United States Patent
Chen et al.

(10) Patent No.: US 12,444,775 B2
(45) Date of Patent: Oct. 14, 2025

(54) ELECTRODE PLATE AND MANUFACTURING METHOD THEREFOR, ELECTRODE ASSEMBLY, SECONDARY BATTERY, AND POWER CONSUMING DEVICE

(71) Applicant: CONTEMPORARY AMPEREX TECHNOLOGY (HONG KONG) LIMITED, Hong Kong (CN)

(72) Inventors: Xingbu Chen, Fujian (CN); Yonghuang Ye, Fujian (CN); Xin Sun, Fujian (CN); Lili Wu, Fujian (CN); Rundie Liu, Fujian (CN); Xuan Li, Fujian (CN); Miaomiao Dong, Fujian (CN); Liang Yun, Fujian (CN); Peidong Song, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 167 days.

(21) Appl. No.: 18/409,803

(22) Filed: Jan. 11, 2024

(65) Prior Publication Data
US 2024/0145794 A1   May 2, 2024

Related U.S. Application Data

(63) Continuation of application No. PCT/CN2022/098870, filed on Jun. 15, 2022.

(51) Int. Cl.
*H01M 10/42* (2006.01)
(52) U.S. Cl.
CPC .... *H01M 10/4242* (2013.01); *H01M 2220/20* (2013.01)

(58) Field of Classification Search
CPC .................. H01M 10/4242; H01M 2220/20
(Continued)

(56) References Cited

U.S. PATENT DOCUMENTS

| 2021/0210762 A1* | 7/2021 | Gao | H01M 4/62 |
| 2022/0059826 A1* | 2/2022 | Chen | H01M 50/434 |
| 2022/0131127 A1* | 4/2022 | Xie | H01M 4/1395 |

FOREIGN PATENT DOCUMENTS

| CN | 102420314 A | 4/2012 |
| CN | 106128791 A | 11/2016 |

(Continued)

OTHER PUBLICATIONS

International Search Report and Written Opinion mailed on Mar. 13, 2023, received for PCT Application PCT/CN2022/098870, filed on Jun. 15, 2022, 11 pages including English Translation.
(Continued)

*Primary Examiner* — James M Erwin
(74) *Attorney, Agent, or Firm* — XSENSUS LLP

(57) ABSTRACT

Lithium replenishing spaces are disposed on a current collection structure, such that the lithium replenishing spaces communicate with an active layer on one side; and the battery is replenished with lithium by using lithium replenishing agents in the lithium replenishing spaces to offset an irreversible lithium consumption in a cycle process, so as to increase the total capacity and the energy density of the battery. According to the present application, due to average weights $M_A$ of corresponding active materials in different distribution regions on the active layer, a sum V0 of internal volumes of lithium replenishing spaces corresponding to each of the distribution regions is controlled in a positively correlated manner based on a change in the average weights of the active materials in the different distribution regions.

15 Claims, 3 Drawing Sheets

(58) Field of Classification Search
USPC .......................................................... 429/209
See application file for complete search history.

(56) References Cited

FOREIGN PATENT DOCUMENTS

| | | | | | |
|---|---|---|---|---|---|
| CN | 111430723 | A | | 7/2020 | |
| CN | 112599723 | A | | 4/2021 | |
| CN | 113130842 | A | | 7/2021 | |
| CN | 214848691 | U | | 11/2021 | |
| CN | 114497468 | A | | 5/2022 | |
| CN | 114497773 | A | * | 5/2022 | .......... H01M 4/0404 |
| CN | 114614023 | A | | 6/2022 | |
| JP | 2016-110777 | A | | 6/2016 | |
| JP | 2018-041828 | A | | 3/2018 | |
| KR | 20210112908 | A | | 9/2021 | |

OTHER PUBLICATIONS

Office Action issued Mar. 31, 2025 in Japanese Patent Application No. 2024-503918 with machine English translation.

\* cited by examiner

ELECTRODE PLATE AND MANUFACTURING METHOD THEREFOR, ELECTRODE ASSEMBLY, SECONDARY BATTERY, AND POWER CONSUMING DEVICE

CROSS-REFERENCE TO RELATED APPLICATION

This application is a Continuation of International Application No. PCT/CN2022/098870, filed on Jun. 15, 2022, which is incorporated herein by reference in its entirety.

TECHNICAL FIELD

The present application relates to the technical field of batteries, and in particular to an electrode plate and a manufacturing method therefor, an electrode assembly, a secondary battery, and a power consuming device.

BACKGROUND ART

With the increasing demand for energy, increasingly high requirements have been put forward for the endurance and the service life of lithium-ion batteries. Generally, silicon negative electrodes have low initial coulombic efficiency. As a result, to apply the silicon negative electrodes to battery products, the silicon negative electrodes have to be replenished with lithium, so as to increase the energy density and prolong the lifespan.

To avoid the problem of fat edges in a coating process, the edges of electrode plates will be thinned. In some cases, a lithium replenishing method such as lithium ribbon calendering will lead to the problem of lithium precipitation due to excessive lithium replenishment in a thinned region or the problem of a capacity loss or insufficient expected lifespan improvement due to insufficient lithium replenishment in a middle large region.

SUMMARY OF THE DISCLOSURE

In view of this, it is necessary to provide an electrode plate and a manufacturing method therefor, an electrode assembly, a secondary battery, and a power consuming device, to implement the quantitative and precise lithium replenishment, thereby increasing the energy density of the battery and prolonging the lifespan of the battery.

According to a first aspect, the present application provides an electrode plate, including: a current collection structure; and two active layers respectively arranged on two opposite side surfaces of the current collection structure along a thickness direction of the current collection structure, where a plurality of lithium replenishing spaces used to communicate with one of the active layers on one side are arranged on the current collection structure, and the lithium replenishing spaces accommodate lithium replenishing agents, where in distribution regions on the active layer communicating with the lithium replenishing spaces, average weights of active materials per unit area of the active layer are denoted as $M_A$, sums of internal volumes of the lithium replenishing spaces that are covered by projections of the distribution regions along the thickness direction of the current collection structure are denoted as V0, and the distribution regions include at least a first distribution region and a second distribution region; and $M_A$ in the first distribution region is less than $M_A$ in the second distribution region, and corresponding V0 in the first distribution region is less than corresponding V0 in the second distribution region.

According to the above electrode plate, the lithium replenishing spaces are disposed on the current collection structure, such that the lithium replenishing spaces keep communication with the active layer on one side; and the battery is replenished with lithium by using the lithium replenishing agents in the lithium replenishing spaces to offset an irreversible lithium consumption in a cycle process, so as to increase the total capacity and the energy density of the battery. According to the present application, due to different average weights $M_A$ of corresponding active materials in at least two distribution regions on the active layer, a sum V0 of internal volumes of lithium replenishing spaces corresponding to each of the distribution regions is controlled in a positively correlated manner based on a change in the average weights of the active materials in different distribution regions, that is, a sum of internal volumes of corresponding lithium replenishing spaces in the second distribution region is relatively large, and a sum of internal volumes of corresponding lithium replenishing spaces in the first distribution region is relatively small. As a result, the different distribution regions are replenished with different lithium, which implements quantitative and precise lithium replenishment, and avoids the problem of lithium precipitation due to excessive lithium replenishment in the first distribution region or the problem of a capacity loss or insufficient expected lifespan improvement due to insufficient lithium replenishment in the second distribution region under the same lithium replenishing amount, thereby increasing the energy density of the battery and prolonging the lifespan of the battery.

In some embodiments, a depth of each of the lithium replenishing spaces is denoted as d, and a thickness of each of the active layers corresponding to positions of the lithium replenishing spaces is denoted as h; and h in the first distribution region is less than h in the second distribution region, and corresponding d in the first distribution region is less than corresponding d in the second distribution region. In this way, the quantitative and precise lithium replenishment can be implemented, and a processing technology for the lithium replenishing spaces is also simplified, thus improving the manufacturing efficiency of the electrode plate.

In some embodiments, the depth d of each of the lithium replenishing spaces satisfies the following relationship:

$$d \leq \frac{C_A \times M_A - C_C \times M_C}{3860 \times 0.534 \times (1 \times P)} \times 10000, \text{ where}$$

$C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm², and P is a proportion of opening areas of all lithium replenishing spaces per unit area on the current collection structure. In this way, the setting of an upper limit of the depth of a lithium replenishing space avoids lithium precipitation of a negative electrode side in the cycle process due to excessive lithium replenishment, thereby improving the safety performance of the battery.

In some embodiments, the proportion P of the opening areas of all the lithium replenishing spaces per unit area satisfies the following relationship: 10%≤P≤50%. In this way, under the condition of ensuring sufficient spaces to accommodate the lithium replenishing agents, the proportion of hole areas of the lithium replenishing spaces is properly controlled to ensure a stable electron conduction function of the current collection structure.

In some embodiments, the depth d of each of the lithium replenishing spaces satisfies the following relationship:

$$d \geq \frac{(C.E._C - C.E._A) \times C_A \times M_A}{3860 * 0.534 * (1 * P)} \times 10000, \text{ where}$$

$C.E._C$ is an initial coulombic efficiency of the positive electrode active material, $C.E._A$ is an initial coulombic efficiency of the negative electrode active material, and $C_A$ is the initial lithium intercalation capacity of the negative electrode active material in mAh/g. In this way, the setting of a lower limit of the depth of a lithium replenishing space makes it possible that the lithium replenishing space is filled with the lithium replenishing agent, which can fully exert the capacity of the positive electrode active material, thus effectively increasing the energy density.

In some embodiments, the lithium replenishing spaces are arranged at intervals in one of the active layers on at least one side, and any adjacent two of the lithium replenishing spaces have an equal spacing. In this way, the uniform arrangement of the lithium replenishing spaces facilitates uniform diffusion of replenished lithium, making the performance of the battery better.

In some embodiments, the current collection structure includes at least one current collector along the thickness direction of the current collection structure, the lithium replenishing spaces penetrating through at least one of current collectors provided with the active layers. This facilitates electron conduction and providing of holes in the current collection structure, allowing the lithium replenishing agents to be stably deposited in the lithium replenishing spaces.

In some embodiments, the current collection structure includes two current collectors, the two active layers are respectively disposed on two side surfaces, facing away from each other, of the two current collectors, and the lithium replenishing spaces penetrate through each of the two current collectors. The lithium replenishing spaces respectively penetrate through the two current collectors, such that the active layers on two sides can be both subject to effective lithium replenishment, thus further increasing the energy density of the battery and prolonging the cycle life of the battery.

In some embodiments, the current collection structure further includes at least one lithium replenishing layer, and the lithium replenishing layer is located between the two current collectors. The at least one lithium replenishing layer is disposed between the two current collectors to increase the lithium replenishing amount, which can effectively prolong the cycle life of the battery.

In some embodiments, the lithium replenishing spaces are lithium replenishing holes, and the lithium replenishing holes extend into one of the active layers on either side along the thickness direction of the current collection structure. In this way, the lithium replenishing spaces are designed as the lithium replenishing holes, and one end of a lithium replenishing hole extends into the active layer, which helps simplify a process for manufacturing the electrode plate, and better help control the corresponding amounts of lithium replenishing agents in different distribution regions, thus implementing more precise lithium replenishment.

In some embodiments, the first distribution region extends around a periphery of the second distribution region. In this way, an average weight $M_A$ of active materials close to an edge of the electrode plate is less than an average weight $M_A$ of active materials close to the middle of the electrode plate. Such a design helps solve the problem of a bulged edge of the electrode plate due to an excessive thickness.

According to a second aspect, the present application provides a method for manufacturing an electrode plate, including the following steps: step S100: providing two single-sided electrode plates, where each of the single-sided electrode plates includes a current collector and an active layer disposed on one side of the current collector; step S200: providing lithium replenishing holes extending into the active layer in the current collector on at least one of the single-sided electrode plates, and controlling average weights $M_A$ of active materials per unit area in at least two distribution regions on the active layer and sums V0 of internal volumes of corresponding lithium replenishing holes to satisfy: $M_A$ in a first distribution region being less than $M_A$ in a second distribution region, and corresponding V0 in the first distribution region being less than corresponding V0 in the second distribution region, where the distribution regions include the first distribution region and the second distribution region; step S300: depositing lithium replenishing agents in the lithium replenishing holes; and step S400: attaching side surfaces, facing away from the active layers, of the two single-sided electrode plates to each other.

According to the above method for manufacturing the electrode plate, the electrode plate required is manufactured by means of attaching single-sided electrode plates to each other, which greatly simplifies a manufacturing process; moreover, it is convenient to provide the holes in the electrode plate, which ensures that the lithium replenishing agents are stably deposited in the lithium replenishing holes, so as to implement quantitative and precise lithium replenishment.

In some embodiments, step S200 includes: step S210: obtaining thicknesses h of the active layer in different distribution regions; step S220: uniformly providing the plurality of lithium replenishing holes in the current collector; and step S230: controlling depths d of lithium replenishing holes in a projection region of each of the distribution regions on the current collector, such that h in the first distribution region is less than h in the second distribution region, and corresponding d in the first distribution region is less than corresponding d in the second distribution region. In this way, the control on the parameters, that is, the sums of the internal volumes of the lithium replenishing holes, is converted into the control on the depths of the lithium replenishing holes by using the thicknesses of the active layer as reference, which can implement the quantitative and precise lithium replenishment, and simplify a processing technology for the lithium replenishing holes, thus improving the manufacturing efficiency of the electrode plate.

In some embodiments, the depth d of each of the lithium replenishing holes satisfies the following relationship:

$$d \leq \frac{C_A \times M_A - C_C \times M_C}{3860 \times 0.534 \times (1 \times P)} \times 10000,$$

where $C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm², and P is a proportion of hole areas of all lithium replenishing holes per unit area on a current collection structure. In this way, the setting of an upper limit of the depth of a lithium replenishing hole avoids lithium precipitation of a negative electrode side in the cycle process due to excessive lithium replenishment, thereby improving the safety performance of the battery.

In some embodiments, the depth d of each of the lithium replenishing holes satisfies the following relationship:

$$d \geq \frac{(C.E._C - C.E._A) \times C_A \times M_A}{3860 * 0.534 * (1 * P)} \times 10000,$$

where $C.E._C$ is an initial coulombic efficiency of the positive electrode active material, $C.E._A$ is an initial coulombic efficiency of the negative electrode active material, and $C_A$ is the initial lithium intercalation capacity of the negative electrode active material in mAh/g. In this way, the setting of a lower limit of the hole depth of a lithium replenishing hole makes it possible that the lithium replenishing hole is filled with the lithium replenishing agent, which can fully exert the capacity of the positive electrode active material, thus effectively increasing the energy density.

According to a third aspect, the present application provides an electrode assembly, including a positive electrode plate, a negative electrode plate, and a separator disposed between the positive electrode plate and the negative electrode plate, where the positive electrode plate and/or the negative electrode plate are/is any one of the above electrode plates.

The above electrode plate is used in the above electrode assembly. Different distribution regions are replenished with different lithium. This implements quantitative and precise lithium replenishment, thereby increasing the energy density of a battery and prolonging the lifespan of the battery.

According to a fourth aspect, the present application provides a secondary battery, including the above electrode assembly.

The above electrode plate is used in the above secondary battery. Different distribution regions are replenished with different lithium. This implements quantitative and precise lithium replenishment, thereby increasing the energy density of the battery and prolonging the lifespan of the battery.

According to a fifth aspect, the present application provides a power consuming device, including the above secondary battery.

The above description is only an overview of the technical solutions of the present application. To more clearly understand the technical means of the present application to implement same according to the contents of the description, and to make the above and other objectives, features, and advantages of the present application more obvious and understandable, specific implementations of the present application are exemplarily described below.

BRIEF DESCRIPTION OF THE DRAWINGS

To more clearly illustrate the technical solutions of the embodiments of the present application, the accompanying drawings required in the embodiments of the present application will be briefly described below. Obviously, the accompanying drawings described below are merely some embodiments of the present application, and for those of ordinary skill in the art, other accompanying drawings can be obtained from these accompanying drawings without making creative efforts.

Figure 1:
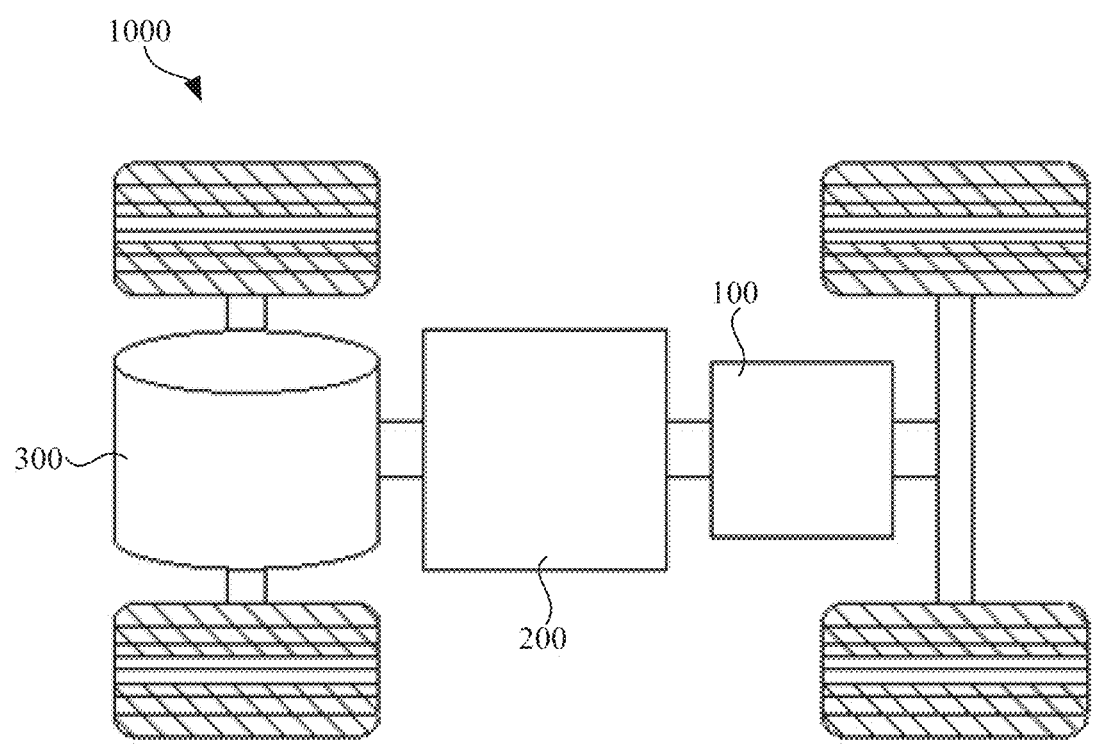
FIG. 1 is a schematic diagram of a structure of a vehicle according to some embodiments of the present application.

1000. vehicle; 100. battery; 200. controller; 300. motor; 110. case; 111. first portion; 112. second portion; 120. battery cell; 10. electrode plate; 11. current collection structure; 11a. current collector; 12. active layer; 13. lithium replenishing space; 13a. lithium replenishing hole; 14. distribution region; 14a. first distribution region; 14b. second distribution region; 15. lithium replenishing layer; and 16. single-sided electrode plate.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "include/comprise" and "has/have" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist. For example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientations or positional relationships indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientations or positional relationships shown in the accompanying drawings, are merely intended to facilitate and simplify the description of the embodiments of the present application, rather than indicating or implying that the apparatus or element referred to must have a particular orientation or be constructed and operated in a particular orientation, and therefore cannot be construed as limiting the embodiments of the present application.

In the description of the embodiments of the present application, unless otherwise explicitly specified and defined, the technical terms such as "mount", "couple", "connect", and "fix" should be understood in a broad sense. For example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

The present applicant noticed that during initial charging of a lithium-ion battery, an organic electrolyte will be reduced and decomposed on a surface of a negative electrode such as a graphite negative electrode to form a solid electrolyte interphase film, which permanently consumes a large amount of lithium from a positive electrode, resulting in low coulombic efficiency of an initial cycle and reduction of the capacity and the energy density of the lithium-ion battery.

To solve the problem with the reduction of the capacity and the energy density of the battery due to an irreversible lithium consumption in a cycle process, it is found by the applicant through research that lithium can be added into the battery by a lithium replenishing method such as lithium ribbon calendering to replenish the battery with lithium ions, thereby increasing the energy density and prolonging the lifespan. During coating, such as transfer coating, a slurry is transferred onto a current collector, such as copper or aluminum foil, by a steel roller to form a layer of coated region having a uniform thickness; next, baking is performed by a tunnel drying oven. However, during the baking, the solid content at an edge of the coated region on the current collector increases faster than that in a middle region. A surface tension of the slurry at the edge of the coated region is greater than that in the middle region, such that the slurry flows to an edge region, resulting in the "fat edge" of a baked electrode plate.

To avoid the fat edge of the electrode plate, the edge of the electrode plate usually needs to be thinned using a device such as a thinning device or a transfer coating machine. However, after thinning, the amounts of active materials are different in different distribution regions on the electrode plate. For example, the amounts of active materials are different between a middle large region and a thinned edge region of the electrode plate. When a same amount of replenished lithium is arranged on the electrode plate, due to small lithium intercalation and deintercalation amount of the active materials in the thinned edge region and the middle large region, the problem of lithium precipitation due to excessive lithium replenishment in the thinned region or the problem of a capacity loss or insufficient expected lifespan improvement due to insufficient lithium replenishment in the middle large region will be caused under the same amount of replenished lithium.

Based on the above considerations, to solve the problem that the lithium cannot be precisely replenished due to different amounts of active materials in different distribution regions, the inventor designs an electrode plate through in-depth research. Average weights of active materials per unit area of the active layer are denoted as $M_A$, and sums of internal volumes of lithium replenishing spaces covered by projections of the distribution regions along a thickness direction of a current collection structure are denoted as V0. $M_A$ in a first distribution region is less than $M_A$ in a second distribution region, and corresponding V0 in the first distribution region is less than corresponding V0 in the second distribution region.

During disposing of the lithium replenishing spaces, a sum V0 of internal volumes of lithium replenishing spaces corresponding to each distribution region is controlled in a positively correlated manner based on a change in average weights of active materials in at least two distribution regions, that is, a sum of internal volumes of corresponding lithium replenishing spaces in the second distribution region is relatively large, and a sum of internal volumes of corresponding lithium replenishing spaces in the first distribution region is relatively small. As a result, the different distribution regions are replenished with different lithium, which implements quantitative and precise lithium replenishment, and avoids the problem of lithium precipitation due to excessive lithium replenishment in the first distribution region or the problem of a capacity loss or insufficient expected lifespan improvement due to insufficient lithium replenishment in the second distribution region under the same lithium replenishing amount, thereby increasing the energy density of the battery and prolonging the lifespan of the battery.

A battery cell disclosed in an embodiment of the present application may be used in, but not limited to, a power consuming device such as a vehicle, a ship, or an aircraft. The battery cell and the battery disclosed in the present application and the like can be used to constitute a power system of the power consuming device. As a result, different distribution regions are replenished with different lithium. This implements quantitative and precise lithium replenishment, thereby increasing the energy density of the battery and prolonging the lifespan of the battery.

An embodiment of the present application provides a power consuming device using a battery as a power supply. The power consuming device may be, but is not limited to, a mobile phone, a tablet, a notebook computer, an electric toy, an electric tool, a battery cart, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

For ease of description of the embodiments below, an example where a power consuming device according to an embodiment of the present application is a vehicle 1000 is used for description.

FIG. 1 is a schematic diagram of a structure of a vehicle 1000 according to some embodiments of the present application. The vehicle 1000 may be a fuel vehicle, a gas vehicle, or a new energy vehicle. The new energy vehicle may be a battery electric vehicle, a hybrid electric vehicle, an extended-range vehicle, etc. A battery 100 is provided inside the vehicle 1000, and the battery 100 may be provided at the bottom, the front or the back of the vehicle 1000. The battery 100 may be configured to supply power to the vehicle 1000. For example, the battery 100 may be used as a power supply for operating the vehicle 1000. The vehicle 1000 may further include a controller 200 and a motor 300. The controller 200 is configured to control the battery 100 to supply power to the motor 300, for example, to meet working power requirements during starting, navigation, and traveling of the vehicle 1000.

In some embodiments of the present application, the battery 100 may not only be used as a power supply for operating the vehicle 1000, but also be used as a power supply for driving the vehicle 1000, replacing or partially replacing fuel or natural gas, to provide driving power for the vehicle 1000.

Figure 2:
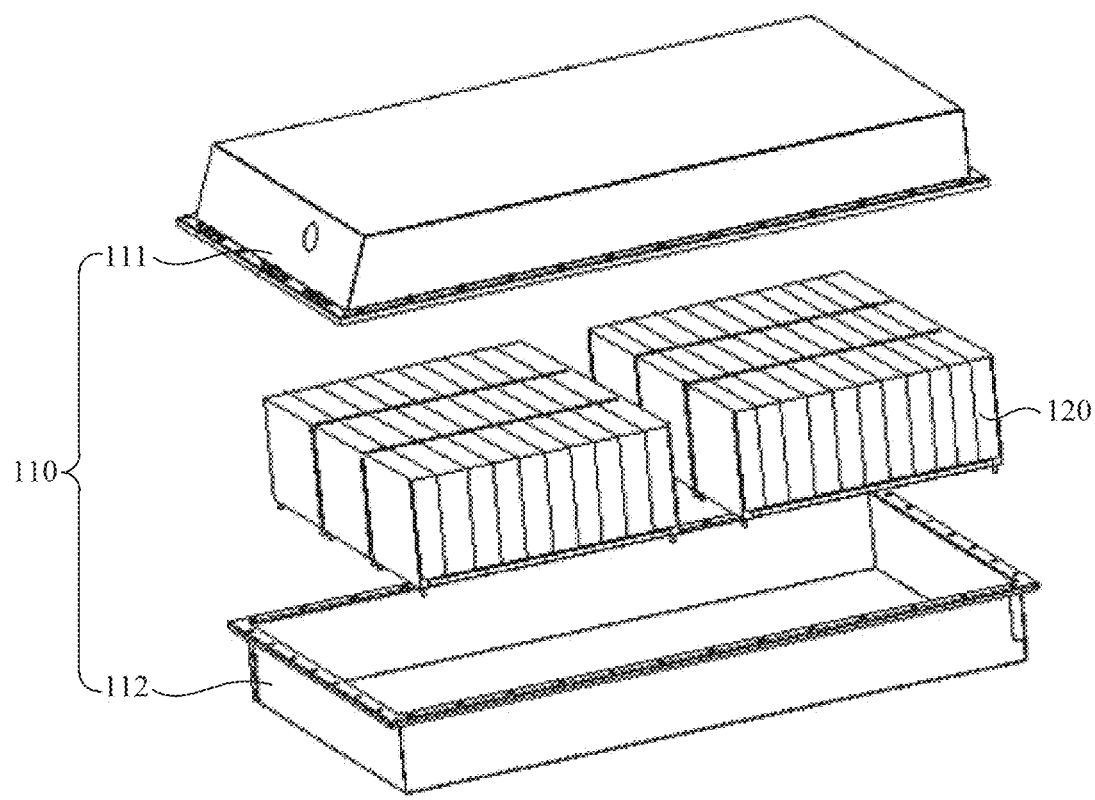
FIG. 2 is an exploded view of a battery according to some embodiments of the present application.

FIG. 2 is an exploded view of a battery 100 according to some embodiments of the present application. The battery 100 includes a case 110 and battery cells 120. The battery cells 120 are accommodated in the case 110. The case 110 is configured to provide an accommodation space for the battery cells 120, and the case 110 may have various structures. In some embodiments, the case 110 may include a first portion 111 and a second portion 112. The first portion 111 and the second portion 112 cover each other, and the first portion 111 and the second portion 112 jointly define the accommodation space for accommodating the battery cells 120. The second portion 112 may be of a hollow structure with one end open, the first portion 111 may be of a plate-like structure, and the first portion 111 covers an open side of the second portion 112, such that the first portion 111 and the second portion 112 jointly define the accommodation space. The first portion 111 and the second portion 112 may also each be of a hollow structure with one side open, and an open side of the first portion 111 covers an open side of the second portion 112. Certainly, the case 110 formed by the first portion 111 and the second portion 112 may be in various shapes, such as a cylinder and a cuboid.

In the battery 100, a plurality of battery cells 120 may be provided. The plurality of battery cells 120 may be connected in series, in parallel, or in series and parallel. The parallel-series connection means that the plurality of battery cells 120 are connected both in series and in parallel. The plurality of battery cells 120 may be directly connected together in series, in parallel, or in series and parallel, and then a unit composed of the plurality of battery cells 120 is accommodated in the case 110. Certainly, the battery 100 may alternatively be in the form that the plurality of battery cells 120 are firstly connected in series, in parallel, or in series and parallel to form a battery 100 module, then a plurality of battery 100 modules are connected in series, in parallel, or in series and parallel to form a unit, and the unit is accommodated in the case 110. The battery 100 may further include other structures. For example, the battery 100 may further include a busbar component configured to implement electrical connections between the plurality of battery cells 120.

Each battery cell 120 may be a secondary battery 100 or a primary battery 100; or may be a lithium-sulfur battery 100, a sodium-ion battery 100, or a magnesium-ion battery 100, but is not limited thereto. The battery cell 120 may be in the shape of a cylinder, a flat body, a cuboid, etc.

Figure 3:
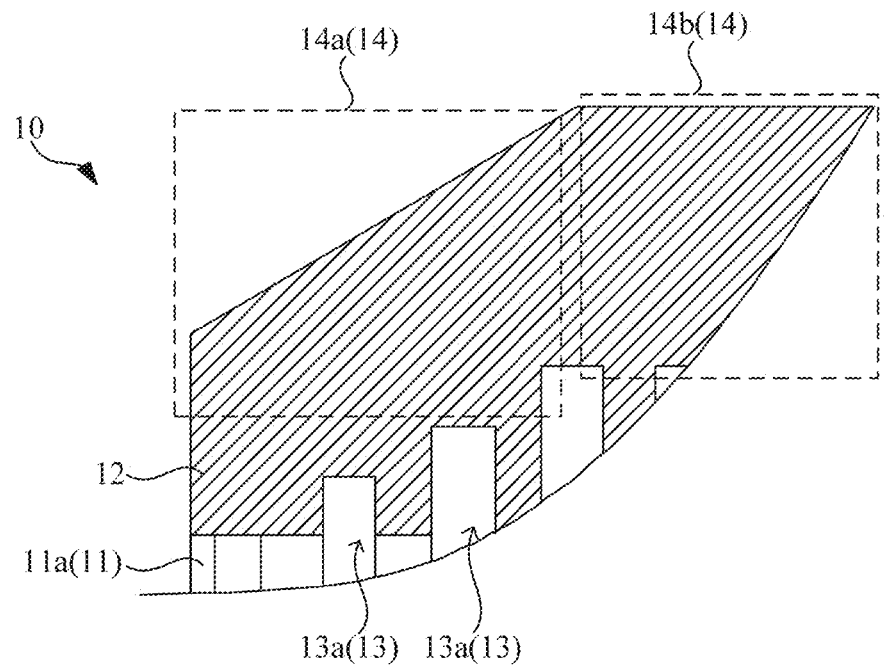
FIG. 3 is a schematic diagram of a partial structure of an electrode plate according to some embodiments of the present application.

According to some embodiments of the present application, referring to FIG. 3, the present application provides an electrode plate 10. The electrode plate 10 includes: a current collection structure 11 and two active layers 12. The two active layers 12 are respectively arranged on two opposite side surfaces of the current collection structure 11 along a thickness direction of the current collection structure 11. A plurality of lithium replenishing spaces 13 used to communicate with one of the active layers 12 on one side are arranged on the current collection structure 11. The lithium replenishing spaces 13 accommodate lithium replenishing agents. In distribution regions 14 on the active layer 12 communicating with the lithium replenishing spaces 13, average weights of active materials per unit area of the active layer 12 are denoted as $M_A$. Sums of internal volumes of the lithium replenishing spaces 13 that are covered by projections of the distribution regions 14 along the thickness direction of the current collection structure 11 are denoted as V0. The distribution regions 14 include at least a first distribution region 14a and a second distribution region 14b. $M_A$ in the first distribution region 14a is less than $M_A$ in the second distribution region 14b, and corresponding V0 in the first distribution region 14a is less than corresponding V0 in the second distribution region 14b.

The current collection structure 11 refers to a component or part that can not only bear active materials, but also collect and output a current generated by active materials in an electrode. The component or part may have one or more layers of structures therein. A material of the current collection structure 11 may have various choices, for example, may be, but is not limited to, a metal material such as copper, aluminum, nickel, and stainless steel; certainly, may alternatively be a semiconductor material such as carbon, and a composite material such as a conductive resin, a titanium nickel shape memory alloy, and carbon coated aluminum foil.

The active layers 12 refer to the active materials coating the current collection structure 11 and have different specific components based on different polarities of the electrode plate 10. For example, active materials on a positive electrode plate may be, but are not limited to, lithium cobaltate, lithium manganate, lithium nickelate, lithium iron phosphate, ternary materials, etc.; and active materials on a negative electrode plate may be, but are not limited to, graphite, lithium titanate, silicon oxide, etc.

The lithium replenishing agents refer to materials capable of replenishing a battery 100 with lithium ions. For example, when the electrode plate 10 is a negative electrode plate, the lithium replenishing agents may be, but are not limited to, lithium foil, lithium powder, lithium silicide powder, etc.; and when the electrode plate 10 is a positive electrode plate, the lithium replenishing agents may be, but are not limited to, $Li_2NiO_2$, $Li_5FeO_4$, $Li_2O$, etc. In addition, the lithium replenishing agents may be formed in the lithium replenishing spaces 13 by means of calendering or deposition, where the deposition manner may be, but is not limited to, magnetron sputtering deposition, etc.

Figure 4:
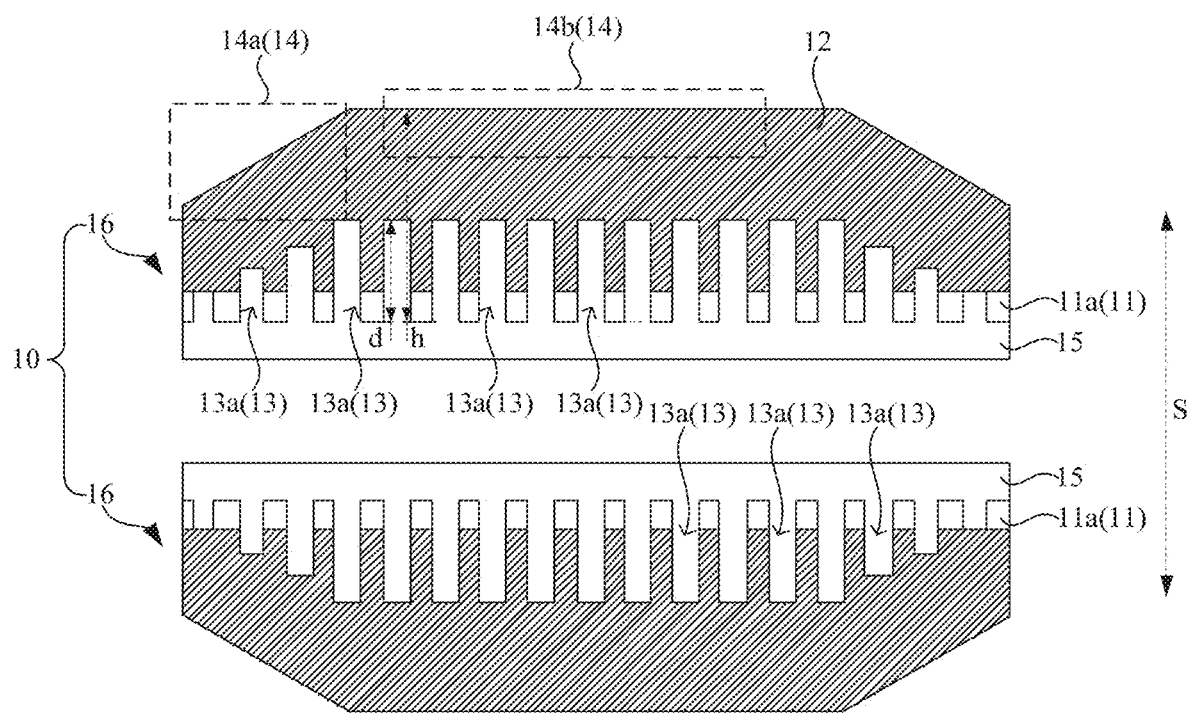
FIG. 4 is a cross-sectional view of a structure of an electrode plate according to some embodiments of the present application.

The lithium replenishing spaces 13 are spaces capable of accommodating the lithium replenishing agents on the current collection structure 11, for example, that have hole or slot structures, or concave structures, etc. When the lithium replenishing spaces 13 are of concave structures on the current collection structure 11, a surface of the current collection structure 11 may be wave-shaped. A plurality of distribution regions 14 are provided on one side surface, facing away from the current collection structure 11, of the active layer 12, and average weights of active materials per unit area are different in at least two distribution regions 14. For example, after an edge of the electrode plate 10 is thinned, an average weight of active materials per unit area in the edge is generally less than an average weight of active materials in the distribution regions 14 in the middle of the electrode plate 10. Factors affecting the average weight of active materials per unit area may be, but are not limited to, a type of active materials, a thickness of active materials, compactness of active materials, etc. Therefore, during disposing of the lithium replenishing spaces 13, the use of the average weight of active materials per unit area as reference can more comprehensively consider the situations affecting the lithium replenishment, making the lithium replenishing amount more precise. For ease of understanding, FIG. 4 is used as an example, and the thickness direction of the current collection structure 11 is a direction indicated by any arrow of S in FIG. 4.

The sums of internal volumes of the lithium replenishing spaces 13 that are covered by the projections of the distribution regions 14 along the thickness direction of the current collection structure 11 should be understood in such a way that in the same active layer 12, a sum of internal volumes of some of the lithium replenishing spaces 13 that can be enclosed by a projection of each distribution region 14 in the thickness direction of the current collection structure 11 is denoted as V0. The internal volumes of the lithium replenishing spaces 13 can determine the total lithium replenishing amount corresponding to the corresponding distribution region 14. It should be noted that factors affecting the sum of the internal volumes of the lithium replenishing spaces 13 corresponding to each distribution region 14 may be, but are not limited to, a depth of the lithium replenishing spaces 13, an opening area of the lithium replenishing spaces 13, a distribution density of the lithium replenishing spaces 13, etc.

The lithium replenishing spaces 13 being capable of communicating with the active layer 12 means that one end of each lithium replenishing space 13 keeps communication with the active layer 12, and the lithium replenishing agent in the lithium replenishing space 13 can penetrate into the active layer 12, so as to implement lithium replenishment. The lithium replenishing space 13 may communicate with the active layer 12 by providing a space on one side, facing the active layer 12, of the current collection structure 11, or by extending one end of the lithium replenishing space 13 into the active layer 12.

The sum of the internal volumes of the lithium replenishing spaces 13 is the sum of the internal volumes of a plurality of lithium replenishing spaces 13 corresponding to one distribution region 14. There are various ways to determine a volume of a single lithium replenishing space 13. For example, first, an opening area of the lithium replenishing space 13 is obtained; then, a depth of the lithium replenishing space 13 is obtained; and finally, the opening area is multiplied by the depth to obtain data, which is the volume of the single lithium replenishing space 13.

The lithium replenishing spaces 13 may be designed in various shapes, for example, may include any one or more of a circle, a square, a rhombus, a triangle, etc. Moreover, the opening areas of all the lithium replenishing spaces 13 can remain consistent or inconsistent. For example, the opening areas of all the lithium replenishing spaces 13 are inconsistent. To ensure diffusion of replenished lithium as uniform as possible, the opening areas of the lithium replenishing spaces 13 should be as small as possible. For example, when the lithium replenishing spaces 13 are circular or square, diameters or widths thereof may range from 5 micrometers (μm) to 1 millimeter (mm). In some embodiments, diameters or widths of the lithium replenishing spaces 13 may range from 30 μm to 200 μm. For example, diameters or widths of the lithium replenishing spaces 13 may be, but are not limited to, 30 μm, 50 μm, μm, 70 μm, 90 μm, 100 μm, 120 μm, 150 μm, 180 μm, and 200 μm.

In the electrode plate 10 according to the present application, the lithium replenishing spaces 13 may be provided on one side of the current collection structure 11 or two sides of the current collection structure 11. If the lithium replenishing spaces 13 are provided on only one side of the current collection structure 11, the electrode plate 10 has a lithium replenishing effect on one side.

The lithium replenishing spaces 13 are disposed on the current collection structure 11, such that the lithium replenishing spaces 13 are located in the active layer 12 on one side; and the battery 100 is replenished with lithium by using lithium replenishing agents in the lithium replenishing spaces 13 to offset an irreversible lithium consumption in a cycle process, so as to increase the total capacity and the energy density of the battery 100. According to the present application, due to different average weights $M_A$ of corresponding active materials in at least two distribution regions 14 on the active layer 12, a sum V0 of internal volumes of lithium replenishing spaces 13 corresponding to each of the distribution regions 14 is controlled in a positively correlated manner based on a change in the average weights of the active materials in different distribution regions 14, that is, a sum of internal volumes of corresponding lithium replenishing spaces 13 in the second distribution region 14b is relatively large, and a sum of internal volumes of corresponding lithium replenishing spaces 13 in the first distribution region 14a is relatively small. As a result, the different distribution regions 14 are replenished with different lithium, which implements quantitative and precise lithium replenishment, and avoids the problem of lithium precipitation due to excessive lithium replenishment in the first distribution region 14a or the problem of a capacity loss or insufficient expected lifespan improvement due to insufficient lithium replenishment in the second distribution region 14b under the same lithium replenishing amount, thereby increasing the energy density of the battery 100 and prolonging the lifespan of the battery.

According to some embodiments of the present application, referring to FIG. 4, a depth of each of the lithium replenishing spaces 13 is denoted as d, and a thickness of each of the active layers 12 corresponding to positions of the lithium replenishing spaces 13 is denoted as h, where h in the first distribution region 14a is less than h in the second distribution region 14b, and corresponding d in the first distribution region 14a is less than corresponding d in the second distribution region 14b.

The thickness of the active layer 12 corresponding to the positions of the lithium replenishing spaces 13 can be understood in such a way that when the positions of the lithium replenishing spaces 13 continue extending to a surface of the active layer 12 along the thickness direction of the current collection structure 11, a length of a path penetrating through the active layer 12 is a thickness of the corresponding active layer 12.

When the thickness of the active layer 12 is used as reference for providing of the spaces, it should be ensured as much as possible that the active layer 12 on one side surface of the current collection structure 11 is the active material of a same type, and it should also be ensured that compactness of the active layers 12 on the current collection structure 11 is the same.

In different distribution regions 14, the control on the parameters, that is, the sums of the internal volumes of the lithium replenishing spaces 13, is converted into the control on the depths of the lithium replenishing spaces 13 by using the thicknesses of the active layer 12 as reference, which can implement the quantitative and precise lithium replenishment, and simplify a processing technology for the lithium replenishing spaces 13, thus improving the manufacturing efficiency of the electrode plate 10.

According to some embodiments of the present application, the depth d of each of the lithium replenishing spaces 13 satisfies the following $$d \leq \frac{C_A \times M_A - C_C \times M_C}{3860 \times 0.534 \times (1 \times P)} \times 10000,$$

where $C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm², and P is a proportion of areas of all lithium replenishing spaces 13 per unit area.

In an inequation, a theoretical specific capacity of lithium metal is 3860 mAh/g; a density of the lithium metal is 0.534 g/cm³; and a unit conversion value is 10000. In addition, the proportion of the hole areas of all the lithium replenishing spaces 13 per unit area should be understood as a ratio of a sum of cross-sectional areas of all the lithium replenishing spaces 13 per unit area to "1".

During lithium replenishment, excessive lithium replenishment easily leads to lithium precipitation of a negative electrode side in a cycle process. In view of this, when the depth of a lithium replenishing space 13 is designed, an upper limit of the depth needs to be set. In addition, if the depth of the lithium replenishing space 13 does not meet the above inequation during manufacturing, an average weight of active materials per unit area of a negative electrode can be increased. For example, the corresponding distribution region 14 is coated with the active materials or the like, so as to ensure that the depth of the lithium replenishing space 13 satisfies the inequation relation.

The setting of the upper limit of the depth of a lithium replenishing space 13 avoids the lithium precipitation of the negative electrode side in the cycle process due to the excessive lithium replenishment, thereby improving the safety performance of the battery 100.

According to some embodiments of the present application, the proportion P of the opening areas of all the lithium replenishing spaces 13 per unit area satisfies the following relationship: 10%≤P≤50%.

The proportion of the opening areas of the lithium replenishing spaces 13 per unit area should not be too large. If the proportion of the areas of the lithium replenishing spaces 13 is too large, a great number of hollow portions will be generated on the current collection structure 11, which seriously affects an electron conduction function of the current collection structure. In some embodiments, the proportion P of the opening areas of all the lithium replenishing spaces 13 per unit area may be, but is not limited to, 10%, 15%, 20%, 25%, 30%, 35%, 40%, 45%, 50%, etc.

The proportion P of the opening areas of all the lithium replenishing spaces 13 per unit area is controlled to be between 10% and 50%. Under the condition of ensuring sufficient spaces to accommodate the lithium replenishing agents, the proportion of the opening areas of the lithium replenishing spaces 13 is properly controlled to ensure the stable electron conduction function of the current collection structure 11.

According to some embodiments of the present application, the depth d of each of the lithium replenishing spaces 13 satisfies the following relationship:

$$d \geq \frac{(C.E._C - C.E._A) \times C_A \times M_A}{3860 * 0.534 * (1 * P)} \times 10000,$$

where $C.E._C$ is an initial coulombic efficiency of the positive electrode active material, $C.E._A$ is an initial coulombic efficiency of the negative electrode active material, and $C_A$ is the initial lithium intercalation capacity of the negative electrode active material in mAh/g.

The initial coulombic efficiency of the positive electrode active material is a ratio of the initial lithium intercalation capacity of the positive electrode active material in mAh/g to the initial lithium deintercalation capacity of the positive electrode active material in mAh/g. The initial coulombic efficiency of the negative electrode active material is a ratio of the initial lithium deintercalation capacity of the negative electrode active material in mAh/g to the initial lithium intercalation capacity of the negative electrode active material in mAh/g. The initial lithium intercalation capacity and the initial lithium deintercalation capacity may be tested by preparing a button cell. For example, a slurry for positive and negative electrodes is prepared based on a conventional formula, an electrode plate 10 is coated on one side and cut into small round button cell discs, and the small round button cell discs and lithium metal sheets constitute a button half-cell. The positive electrode plate is tested using a 0.1 C/0.1 C charge/discharge rate. For a positive electrode material, the button cell is charged first and then discharged. An initial charge capacity thereof is the initial lithium deintercalation capacity of the positive electrode active material, and an initial discharge capacity thereof is the initial lithium intercalation capacity of the positive electrode active material. The negative electrode plate is tested using a 0.1 C/0.05 C charge/discharge rate. For a negative electrode material, the button cell is discharged first and then charged. An initial discharge capacity thereof is the initial lithium intercalation capacity of the negative electrode active material, and an initial charge capacity thereof is the initial lithium deintercalation capacity of the negative electrode active material.

When the depth d of a lithium replenishing space 13 is greater than or equal to $$\frac{(C.E._C - C.E._A) \times C_A \times M_A}{3860 * 0.534 * (1 * P)} \times 10000,$$

it can be ensured that the capacity of the positive electrode active material is fully exerted, thus effectively increasing the capacity and the energy density of the battery 100. Moreover, with a further increase in the depth d, the lithium replenishing amount also increases. Although the capacity of the positive electrode active material is fully exerted to its limit in this case, which will not be further improved, the cycle life can be effectively prolonged.

If the depth d of each lithium replenishing space 13 satisfies the following two conditions at the same time: being greater than or equal to $$\frac{(C.E._C - C.E._{..A}) \times C_A \times M_A}{3860 * 0.534 * (1 * P)} \times 10000,$$

and being less than or equal to $$\frac{C_A \times M_A - C_C \times M_C}{3860 \times 0.534 \times (1 \times P)} \times 10000,$$

the battery 100 has a better lithium replenishing effect. If the depth d of each lithium replenishing space 13 cannot satisfy the following two conditions at the same time: being greater than or equal to $$\frac{(C.E_C - C.E._A) \times C_A \times M_A}{3860 * 0.534 * (1 * P)} \times 10000,$$

and being less than or equal to $$\frac{C_A \times M_A - C_C \times M_C}{3860 \times 0.534 \times (1 \times P)} \times 10000,$$

the depth d of the lithium replenishing space 13 should be preferentially controlled to be less than or equal to $$\frac{C_A \times M_A - C_C \times M_C}{3860 \times 0.534 \times (1 \times P)} \times 10000.$$

Certainly, in this case, the depth d of the lithium replenishing space 13 can be controlled to satisfy both of the above two inequations by increasing the average weight of the active materials per unit area of the negative electrode.

The setting of a lower limit of the depth of a lithium replenishing space 13 makes it possible that the lithium replenishing space 13 is filled with the lithium replenishing agent (such as lithium metal), which can fully exert the capacity of the positive electrode active material, thus effectively increasing the energy density.

According to some embodiments of the present application, referring to FIG. 4, the lithium replenishing spaces 13 are arranged at intervals in one of the active layers 12 on at least one side, and any adjacent two of the lithium replenishing spaces 13 have an equal spacing.

Any adjacent two of the lithium replenishing spaces 13 having an equal spacing can be understood in such a way that the lithium replenishing spaces 13 are uniformly arranged at intervals on one side of the current collection structure 11, that is, the distribution density of the lithium replenishing spaces 13 is fixed. In this case, the sum of the internal volumes of the corresponding lithium replenishing spaces 13 in each distribution region 14 mainly depends on the depth of the lithium replenishing spaces 13. As a result, a change relationship between V0 and $M_A$, when controlled, can be effectively transformed into a change relationship between d and h.

When the lithium replenishing spaces are arranged in the active layer 12 on at least one side, it indicates that the plurality of lithium replenishing spaces 13 may be provided in the active layer 12 on only one side of the electrode plate 10 according to the present application. Certainly, the plurality of lithium replenishing spaces 13 may also be correspondingly disposed in each of the active layers 12 on two sides.

The lithium replenishing spaces 13 are uniformly distributed in the active layer 12 on either side, making it easy to implement the quantitative and precise lithium replenishment by only controlling the depths of the lithium replenishing spaces 13. Moreover, the uniform arrangement of the lithium replenishing spaces 13 facilitates uniform diffusion of replenished lithium, making the performance of the battery 100 better.

According to some embodiments of the present application, referring to FIG. 4, the current collection structure 11 includes at least one current collector 11a along the thickness direction of the current collection structure 11. The lithium replenishing spaces 13 penetrate through at least one of current collectors 11a provided with the active layers 12.

The current collector 11a refers to a component or part that can not only bear active materials, but also collect and output a current generated by active materials in an electrode, and is a core structure of the current collection structure 11. There may be one or more current collectors 11a. When there is one current collector 11a, two active layers 12 are arranged on two opposite side surfaces of the same current collector 11a; and when there are a plurality of current collectors 11a, two active layers 12 are respectively arranged on the current collectors 11a located at two outermost ends of the current collection structure in the thickness direction of the current collection structure 11. In addition, when there are a plurality of current collectors 11a, the plurality of current collectors 11a are stacked along the thickness direction of the current collection structure 11.

The lithium replenishing spaces 13 are designed in a plurality of states on current collectors 11a. For example, when there is one current collector 11a, the lithium replenishing spaces 13 that penetrate through the current collector can extend to one side; or some of the lithium replenishing spaces 13 extend to the active layer 12 on one side, while the other lithium replenishing spaces 13 extend to the active layer 12 on the other side; and when there are a plurality of current collectors 11a, the lithium replenishing spaces 13 penetrate through only one current collector 11a and extend to the corresponding active layer 12; or the lithium replenishing spaces 13 penetrate through each of two current collectors 11a located at outermost ends.

The current collection structure 11 is designed to have at least one current collector 11a. This facilitates electron conduction and providing of holes in the current collection structure 11, allowing the lithium replenishing agents to be stably deposited in the lithium replenishing spaces 13.

According to some embodiments of the present application, referring to FIG. 4, there are two current collectors 11a. Two active layers 12 are respectively disposed on side surfaces, facing away from each other, of the two current collectors 11a. The lithium replenishing spaces 13 penetrate through each of the two current collectors 11a.

When the lithium replenishing spaces 13 penetrate through the two current collectors 11a, one end of each lithium replenishing space 13 on each current collector 11a extends into the corresponding active layer 12. The lithium replenishing spaces 13 may be distributed on the current collectors 11a in a plurality of manners. For example, the lithium replenishing spaces 13 are uniformly distributed on the current collectors 11a; or the lithium replenishing spaces 13 can be distributed according to different thicknesses of the active layers 12, for example, a relatively large number of lithium replenishing spaces 13 are correspondingly distributed in a thicker active layer 12, while a relatively small number of lithium replenishing spaces 13 are correspondingly distributed in a thinner active layer 12.

There are also various corresponding relationships between the distributions of the lithium replenishing spaces 13 on the two current collectors 11a. For example, a distribution of the lithium replenishing spaces 13 on one current collector 11a is completely staggered from a distribution of the lithium replenishing spaces 13 on the other current collector 11a, that is, the lithium replenishing spaces 13 on one side do not communicate with the lithium replenishing spaces 13 on the other side; or a distribution of the lithium replenishing spaces 13 on one current collector 11a is completely aligned with a distribution of the lithium replenishing spaces 13 on the other current collector 11a, that is, the lithium replenishing spaces 13 on one side keep communication with the lithium replenishing spaces 13 on the other side. When the lithium replenishing spaces 13 on the two current collectors 11a keep communication with each other, the lithium replenishing agents in the lithium replenishing spaces 13 on the two current collectors 11a can be shared by each other, that is, the lithium replenishing agents in the lithium replenishing spaces 13 on one side can be used for lithium replenishment of the active layer 12 on the other side.

A connection between the two current collectors 11a may be, but is not limited to, welding, bonding, etc. For example, during manufacturing, the two current collectors 11a coated with the active layers 12 are attached to each other on respective sides provided with the lithium replenishing spaces 13; and after attaching, circumferential edges of the two current collectors 11a are connected by means of welding or bonding.

The lithium replenishing spaces 13 respectively penetrate through the two current collectors 11a, such that the active layers 12 on two sides can be both subject to effective lithium replenishment, thus further increasing the energy density of the battery 100 and prolonging the cycle life of the battery.

According to some embodiments of the present application, referring to FIG. 4, the current collection structure 11 further includes at least one lithium replenishing layer 15. The lithium replenishing layer 15 is located between the two current collectors 11a.

The lithium replenishing layer 15 refers to a material capable of replenishing the battery 100 with lithium ions. For example, when the electrode plate 10 is a negative electrode plate, the lithium replenishing layer 15 may be, but is not limited to, a lithium metal layer, etc.; and when the electrode plate 10 is a positive electrode plate, the lithium replenishing layer 15 may be, but is not limited to, $Li_2NiO_2$, $Li_5FeO_4$, $Li_2O$, etc.

There may be one or more lithium replenishing layers 15 between the two current collectors 11a. When there are two lithium replenishing layers 15, one lithium replenishing layer 15 is attached to one side surface, facing away from the corresponding active layer 12, of one current collector 11a; and the other lithium replenishing layer 15 is attached to one side surface, facing away from the corresponding active layer 12, of the other current collector 11a.

The at least one lithium replenishing layer 15 is disposed between the two current collectors 11a to increase the lithium replenishing amount, which can effectively prolong the cycle life of the battery 100.

According to some embodiments of the present application, referring to FIG. 4, the lithium replenishing spaces 13 are lithium replenishing holes 13a. The lithium replenishing holes 13a extend into the active layer 12 on either side along the thickness direction of the current collection structure 11.

The lithium replenishing holes 13a extending into the active layer 12 along the thickness direction of the current collection structure 11 should be understood in such a way that one end of a lithium replenishing hole, namely, a lithium replenishing space 13 is located inside the active layer 12 and does not penetrate through the active layer 12, which is similar to a blind hole structure.

The lithium replenishing spaces 13 are designed as the lithium replenishing holes 13a, and one end of a lithium replenishing hole 13a extends into the active layer 12, which helps simplify a process for manufacturing the electrode plate 10, and better help control the corresponding amounts of lithium replenishing agents in different distribution regions 14, thus implementing more precise lithium replenishment.

According to some embodiments of the present application, referring to FIG. 4, the first distribution region 14a extends around a periphery of the second distribution region 14b.

The first distribution region 14a is relatively close to the edge of the electrode plate 10, while the second distribution region 14b is relatively close to the middle of the electrode plate 10; moreover, the first distribution region 14a is of a line ring structure.

An average weight $M_A$ of active materials close to the edge of the electrode plate 10 is less than an average weight $M_A$ of active materials close to the middle of the electrode plate 10. Such a design helps solve the problem of a bulged edge of the electrode plate 10 due to excessive thickness.

Figure 5:
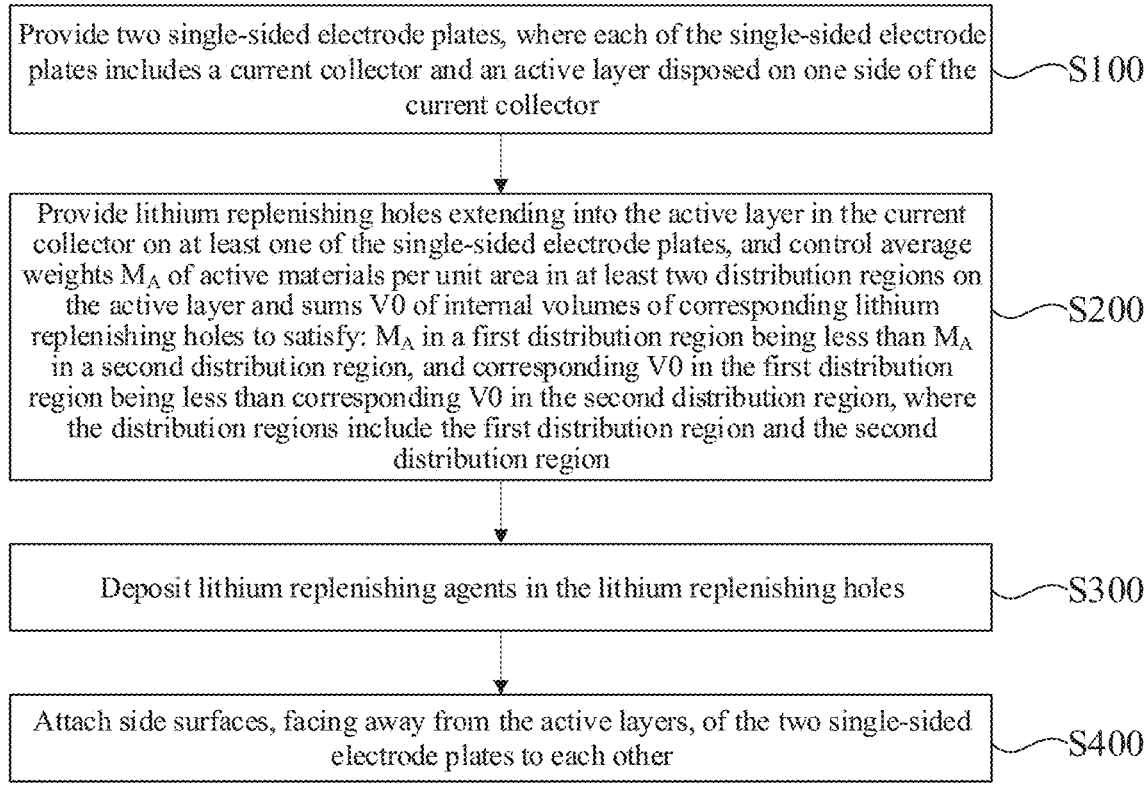
FIG. 5 is a first flowchart of a method for manufacturing an electrode plate according to some embodiments of the present application.

According to some embodiments of the present application, referring to FIG. 5, a method for manufacturing an electrode plate 10 is provided, including the following steps:

S100: providing two single-sided electrode plates 16, where each of the single-sided electrode plates 16 includes a current collector 11a and an active layer 12 disposed on one side of the current collector 11a;

S200: providing lithium replenishing holes 13a extending into the active layer 12 in the current collector 11a on at least one of the single-sided electrode plates 16, and controlling average weights $M_A$ of active materials per unit area in at least two distribution regions 14 on the active layer 12 and sums V0 of internal volumes of corresponding lithium replenishing holes 13a to satisfy: $M_A$ in a first distribution region 14a being less than $M_A$ in a second distribution region 14b, and corresponding V0 in the first distribution region 14a being less than corresponding V0 in the second distribution region 14b, where the distribution regions 14 include the first distribution region 14a and the second distribution region 14b;

S300: depositing lithium replenishing agents in all the lithium replenishing holes 13a; and S400: attaching side surfaces, facing away from the active layers 12, of the two single-sided electrode plates 16 to each other.

In step S100, a single-sided electrode plate 16 can be roughly understood as half of the structure of an electrode plate 10, that is, the single-sided electrode plate includes the current collector 11a and the active layer 12 coating one side surface of the current collector 11a. In this case, the other side of the current collector 11a is not coated with the active layer 12. A process for manufacturing the single-sided electrode plates 16 may not be included in the method for manufacturing the electrode plate 10 according to the present application, and is directly completed by a supplier or other processes. Certainly, the process for manufacturing the single-sided electrode plates 16 may alternatively be included in the method for manufacturing the electrode plate 10 according to the present application. For example, one side surface of the current collector 11a is coated with the active materials; and after coating, the current collector 11a is compacted by means of rolling (cold pressing) to rearrange and densify powder. In addition, to avoid fat edges of the single-sided electrode plates 16, the edges of the single-sided electrode plates 16 are thinned. In this case, average weights of active materials are different in different distribution regions 14 on the active layer 12.

In step S200, the holes can be formed on the current collector 11a in various ways of, for example, laser drilling, rolling screw puncturing, etc.

In step S300, during deposition of the lithium replenishing agents in the lithium replenishing holes 13a, the lithium replenishing agents should be fully deposited in the lithium replenishing holes 13a, that is, the lithium replenishing agent in each lithium replenishing hole can be flush with one end of the lithium replenishing hole 13a on the current collector 11a. The deposition manner of the lithium replenishing agents may be, but is not limited to, lithium ribbon calendering, magnetron sputtering deposition, etc.

In step S400, side surfaces, facing away from the active layers 12, of the two single-sided electrode plates 16 being attached to each other can be understood in such a way that surfaces of the single-sided electrode plates 16 provided with the holes are attached to each other for assembly. As a result, during subsequent manufacturing of an electrode assembly, the active layers 12 on the single-sided electrode plates 16 separately face a separator (such as an isolation film).

The electrode plate 10 required is manufactured by means of attaching single-sided electrode plates 10 to each other, which greatly simplifies a manufacturing process; moreover, it is convenient to provide the holes in the electrode plate 10, which ensures that the lithium replenishing agents are stably deposited in the lithium replenishing holes 13a, so as to implement quantitative and precise lithium replenishment. According to the present application, due to average weights $M_A$ of corresponding active materials in different distribution regions 14 on the active layer 12, a sum V0 of internal volumes of lithium replenishing holes 13a corresponding to each of the distribution regions 14 is controlled in a positively correlated manner based on a change in the average weights of the active materials in the different distribution regions 14, that is, a sum of internal volumes of corresponding lithium replenishing holes 13a in the second distribution region 14b is relatively large, and a sum of internal volumes of corresponding lithium replenishing holes 13a in the first distribution region 14a is relatively small. As a result, the different distribution regions 14 are replenished with different lithium, which implements quantitative and precise lithium replenishment, and avoids the problem of lithium precipitation due to excessive lithium replenishment in the first distribution region 14a (such as a thinned region) or the problem of a capacity loss or insufficient expected lifespan improvement due to insufficient lithium replenishment in the second distribution region 14b (such as a large region) under the same lithium replenishing amount, thereby increasing the energy density of the battery 100 and prolonging the lifespan of the battery.

Figure 6:
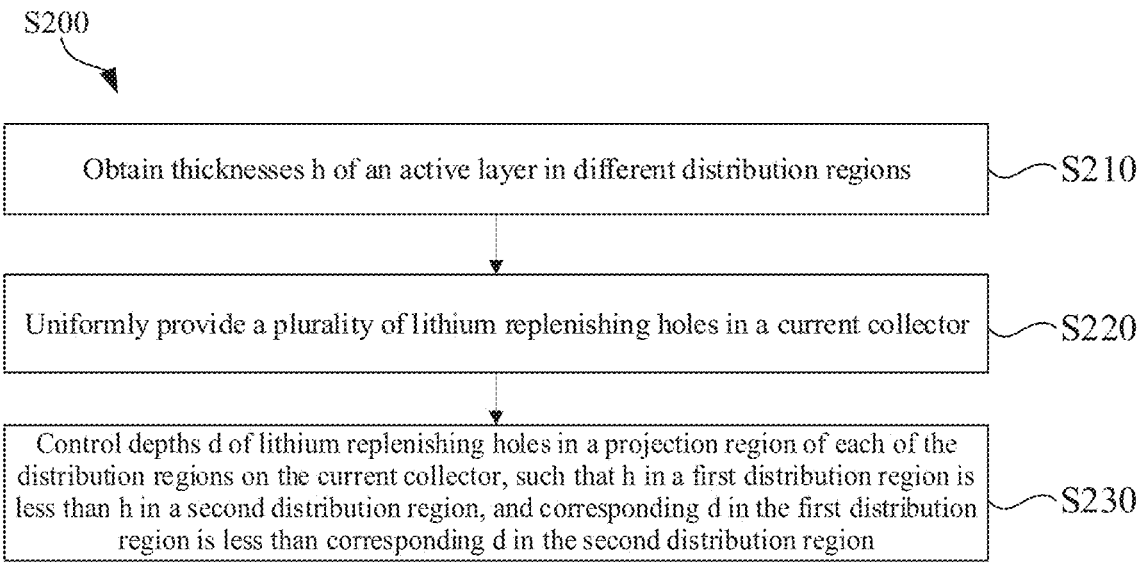
FIG. 6 is a second flowchart of a method for manufacturing an electrode plate according to some embodiments of the present application.

According to some embodiments of the present application, referring to FIG. 6, step S200 of controlling average weights $M_A$ of active materials per unit area in different distribution regions 14 on the active layer 12 and sums V0 of internal volumes of corresponding lithium replenishing holes 13a to be changed in a positively correlated manner includes:

S210: obtaining thicknesses h of the active layer 12 in different distribution regions 14;

S220: uniformly providing the plurality of lithium replenishing holes 13a in the current collector 11a; and S230: controlling depths d of lithium replenishing holes 13a in a projection region of each of the distribution regions 14 on the current collector 11a, such that h in the first distribution region 14a is less than h in the second distribution region 14b, and corresponding d in the first distribution region 14a is less than corresponding d in the second distribution region 14b.

In step S220, uniformly providing the plurality of lithium replenishing holes 13a should be understood in such a way that any adjacent two lithium replenishing holes 13a have an equal spacing. Factors affecting the sum of the internal volumes of the lithium replenishing holes 13a corresponding to each distribution region 14 may be, but are not limited to, a hole depth of the lithium replenishing holes 13a, a distribution density of the lithium replenishing holes 13a, etc., such that the distribution density of the lithium replenishing holes 13a is controlled to be fixed. In this case, the sum of the internal volumes of the corresponding lithium replenishing holes 13a in each distribution region 14 mainly depends on the hole depth of the lithium replenishing holes 13a. As a result, a change relationship between V0 and $M_A$, when controlled, can be effectively transformed into a change relationship between d and h.

The control on the parameters, that is, the sums of the internal volumes of the lithium replenishing holes 13a, is converted into the control on the hole depths of the lithium replenishing holes 13a by using the thicknesses of the active layer 12 as reference, which can implement the quantitative and precise lithium replenishment, and simplify a processing technology for the lithium replenishing holes 13*a*, thus improving the manufacturing efficiency of the electrode plate 10.

According to some embodiments of the present application, the depth d of each of the lithium replenishing holes 13*a* satisfies the following relationship:

$$d \le \frac{C_A \times M_A - C_C \times M_C}{3860 \times 0.534 \times (1 \times P)} \times 10000,$$

where $C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm$^2$, and P is a proportion of hole areas of all lithium replenishing holes 13*a* per unit area on a current collection structure 11.

During lithium replenishment, excessive lithium replenishment easily leads to lithium precipitation of a negative electrode side in a cycle process. In view of this, when the hole depth of each lithium replenishing hole 13*a* is designed, an upper limit of the hole depth needs to be set. In addition, if the hole depth of the lithium replenishing hole 13*a* does not meet the above inequation during manufacturing, an average weight of active materials per unit area of a negative electrode can be increased. For example, the corresponding distribution region 14 is coated with the active materials or the like, so as to ensure that the hole depth of the lithium replenishing hole 13*a* satisfies the inequation relation.

The setting of the upper limit of the hole depth of a lithium replenishing hole 13*a* avoids the lithium precipitation of the negative electrode side in the cycle process due to the excessive lithium replenishment, thereby improving the safety performance of the battery 100.

According to some embodiments of the present application, the depth d of each of the lithium replenishing holes 13*a* satisfies the following relationship:

$$d \ge \frac{(C.E._C - C.E._A) \times C_A \times M_A}{3860 * 0.534 * (1 * P)} \times 10000,$$

where

C.E.$_C$ is an initial coulombic efficiency of the positive electrode active material, C.E.$_A$ is an initial coulombic efficiency of the negative electrode active material, and $C_A$ is the initial lithium intercalation capacity of the negative electrode active material in mAh/g.

When the depth d of a lithium replenishing hole 13*a* is greater than or equal to $$\frac{(C.E._C - C.E._A) \times C_A \times M_A}{3860 * 0.534 * (1 * P)} \times 10000,$$

it can be ensured that the capacity of the positive electrode active material is fully exerted, thus effectively increasing the capacity and the energy density of the battery 100. Moreover, with a further increase in the depth d, the lithium replenishing amount also increases. Although the capacity of the positive electrode active material is fully exerted to its limit in this case, which will not be further improved, the cycle life can be effectively prolonged.

If the depth d of each lithium replenishing hole 13*a* satisfies the following two conditions at the same time: being greater than or equal to $$\frac{(C.E._C - C.E._A) \times C_A \times M_A}{3860 * 0.534 * (1 * P)} \times 10000,$$

and being less than or equal to $$\frac{C_A \times M_A - C_C \times M_C}{3860 \times 0.534 \times (1 \times P)} \times 10000,$$

the battery 100 has a better lithium replenishing effect. If the depth d of each lithium replenishing hole 13*a* cannot satisfy the following two conditions at the same time: being greater than or equal to $$\frac{(C.E._C - C.E._A) \times C_A \times M_A}{3860 * 0.534 * (1 * P)} \times 10000,$$

and being less than or equal to $$\frac{C_A \times M_A - C_C \times M_C}{3860 \times 0.534 \times (1 \times P)} \times 10000,$$

the depth d of the lithium replenishing hole 13*a* should be preferentially controlled to be less than or equal to $$\frac{C_A \times M_A - C_C \times M_C}{3860 \times 0.534 \times (1 \times P)} \times 10000.$$

Certainly, in this case, the depth d of the lithium replenishing hole 13*a* can be controlled to satisfy both of the above two inequations by increasing the average weight of the active materials per unit area of the negative electrode.

The setting of a lower limit of the hole depth of a lithium replenishing hole 13*a* makes it possible that the lithium replenishing hole 13*a* is filled with the lithium replenishing agent (such as lithium metal), which can fully exert the capacity of the positive electrode active material, thus effectively increasing the energy density.

To make the objective, technical solutions, and advantages of the present application more concise and clearer, the present application is described using the specific embodiments below, but is by no means limited to these embodiments. The embodiments described below are merely preferred embodiments of the present application, can be used to describe the present application, and should not be construed as a limitation to the scope of the present application. It should be pointed out that any modifications, equivalent substitutions, improvements, and the like made within the spirit and principle of the present application should fall within the scope of protection of the present application.

To better illustrate the present application, the content of the present application is further described below with reference to the embodiments. The following are specific embodiments.

In a same chemical system (that is, current collectors 11*a* of a positive electrode plate and a negative electrode plate are of the same type), there is an influence of the depth d of a lithium replenishing hole 13a on the number of cycles of the battery 100.

Comparative Example 1

Negative Electrode Plate:

High silicon is used as a current collector 11a of a negative electrode, an average weight $M_A$ of active materials per unit area in a first distribution region 14a of an edge of the negative electrode is 0.0075 g/cm², an average weight $M_A$ of active materials per unit area in a second distribution region 14b of the edge of the negative electrode is 0.0100 g/cm², an initial lithium intercalation capacity (a gram capacity of charging) $C_A$ of the active materials is 800 mAh/g, and an initial efficiency (an initial discharge capacity/an initial charge capacity) of the negative electrode is 80%.

A proportion P of hole areas of lithium replenishing holes 13a per unit area is set to 50%, and based on an inequation $$\frac{(C.E._C - C.E._A) \times C_A \times M_A}{3860 * 0.534 * (1 * P)} \times 10000 \leq d \leq \frac{C_A \times M_A - C_C \times M_C}{3860 \times 0.534 \times (1 \times P)} \times 10000,$$

a depth d of each of the lithium replenishing holes 13a corresponding to the second distribution region 14b is calculated to be 7.8 µm to 13.6 µm, and a depth d of each of the lithium replenishing holes 13a corresponding to the first distribution region 14a is calculated to be 5.8 µm to 7.0 µm.

In this example, the hole depth corresponding to the second distribution region 14b is designed as 0 µm (that is, no holes are formed), and the hole depth corresponding to the first distribution region 14a is designed as 0 µm (that is, no holes are formed). However, for ease of comparison, the proportion P of the hole areas of the lithium replenishing holes 13a in Comparative example 1 is still recorded as 50%.

Positive Electrode Plate:

NCM (a ternary material composed of nickel, cobalt, and manganese) is used as a current collector 11a of a positive electrode, an average weight $M_C$ of active materials per unit area in a first distribution region 14a of an edge of the positive electrode is 0.0240 g/cm², an average weight $M_C$ of active materials per unit area in a second distribution region 14b of the edge of the positive electrode is 0.0300 g/cm², an initial lithium intercalation capacity (a gram capacity of charging) $C_C$ of the active materials is 220 mAh/g, and an initial efficiency (an initial discharge capacity/an initial charge capacity) of the positive electrode is 90%.

Example 1

This example is basically the same as Comparative example 1, only except that in a negative electrode plate, a case depth d of each of lithium replenishing holes 13a corresponding to a second distribution region 14b is designed as 10 µm, and a case depth d of each of lithium replenishing holes 13a corresponding to a first distribution region 14a is designed as 10 µm.

Example 2

This example is basically the same as Comparative example 1, only except that in a negative electrode plate, a case depth d of each of lithium replenishing holes 13a corresponding to a second distribution region 14b is designed as 6.5 µm, and a case depth d of each of lithium replenishing holes 13a corresponding to a first distribution region 14a is designed as 6.5 µm.

Example 3

This example is basically the same as Comparative example 1, only except that in a negative electrode plate, a case depth d of each of lithium replenishing holes 13a corresponding to a second distribution region 14b is designed as 10 µm, and a case depth d of each of lithium replenishing holes 13a corresponding to a first distribution region 14a is designed as 6.5 µm.

Some parameters of Examples and Comparative examples are as shown in Table 1-1 and Table 1-2 below.

Batteries 100 prepared in Comparative examples and Examples above are tested for cycle performance at normal temperature, and results are as shown in Table 1-2. Specific test steps are as follows.

At 25° C., a battery 100 was charged at a constant current of 1 C to 4.25 V, then was charged at a constant voltage to a current of 0.05 C, and then was discharged at the constant current of 1 C to 2.8 V. This was an initial cycle. Cycle charge/discharge was performed based on the above conditions. The number of cycles of the battery 100 when a capacity retention rate of the battery 100 was reduced to 80% was recorded.

TABLE 1-1

| | | Positive electrode | | | | Negative electrode | | | |
|---|---|---|---|---|---|---|---|---|---|
| Item | Chemical system | Initial efficiency C | Gram capacity of charging $C_C$ | $M_C$ in second distribution region, g/cm² | $M_C$ in first distribution region, g/cm² | Initial efficiency A | Gram capacity of charging $C_A$ | $M_A$ in second distribution region, g/cm² | $M_A$ in first distribution region, g/cm² |
| Comparative example 1 | NCM/high silicon | 90.0% | 220 | 0.0300 | 0.0240 | 80% | 800 | 0.0100 | 0.0075 |
| Example 1 | NCM/high silicon | 90.0% | 220 | 0.0300 | 0.0240 | 80% | 800 | 0.0100 | 0.0075 |
| Example 2 | NCM/high silicon | 90.0% | 220 | 0.0300 | 0.0240 | 80% | 800 | 0.0100 | 0.0075 |
| Example 3 | NCM/high silicon | 90.0% | 220 | 0.0300 | 0.0240 | 80% | 800 | 0.0100 | 0.0075 |

TABLE 1-2

| Case number | Chemical system | Proportion P of hole areas | Optional depth d/μm in second distribution region | | | Optional depth d/μm in first distribution region | | | Exertion of gram capacity of positive electrode, mAh/g | Number of cycles corresponding to capacity retention rate 80% |
|---|---|---|---|---|---|---|---|---|---|---|
| | | | Minimum | Maximum | Case hole depth | Minimum | Maximum | Case hole depth | | |
| Comparative example 1 | NCM/high silicon | 50% (actually 0%) | 7.8 | 13.6 | 0.0 | 5.8 | 7.0 | 0.0 | 166.7 | 330 |
| Example 1 | NCM/high silicon | 50% | 7.8 | 13.6 | 10.0 | 5.8 | 7.0 | 10.0 | 202.7 | 260 |
| Example 2 | NCM/high silicon | 50% | 7.8 | 13.6 | 6.5 | 5.8 | 7.0 | 6.5 | 194.5 | 380 |
| Example 3 | NCM/high silicon | 50% | 7.8 | 13.6 | 10.0 | 5.8 | 7.0 | 6.5 | 202.4 | 720 |

From Table 1-2, it can be learned that batteries 100 provided with lithium replenishing holes 13a on electrode plates 10 are all effectively improved in terms of exertion of the gram capacities of the positive electrodes relative to the battery 100 not provided with the holes in Comparative example 1. Moreover, batteries in Example 2 and Example 3 are both improved in terms of the number of cycles corresponding to capacity retention rate 80% relative to the battery 100 in Comparative example 1. However, the number of cycles in Example 1 is reduced, which indicates that the hole depths of the lithium replenishing holes 13a are not unrestricted and need to be less than or equal to maximum hole depths of the lithium replenishing holes in different distribution regions 14. If the lithium replenishing holes are too deep, lithium precipitation is prone to occurrence in a cycle process.

Through comparison between Examples 1 to 2 and Example 3, it can be learned that when the depth d of a lithium replenishing hole 13a satisfies an inequation $$\frac{(C.E._C - C.E._A) \times C_A \times M_A}{3860 * 0.534 * (1 * P)} \times 10000 \leq d \leq \frac{C_A \times M_A - C_C \times M_C}{3860 \times 0.534 \times (I \times P)} \times 10000,$$

the battery 100 is optimal in performance: exertion of the gram capacity of the positive electrode and the number of cycles.

In addition, when the depths d of the lithium replenishing holes 13a are changed in a positively correlated manner with different distribution regions 14, for example, the depth d in the second distribution region 14b is designed to be relatively large, and the depth d in the first distribution region 14a is designed to be relatively small, the battery 100 is optimal in data of exertion of the gram capacity of the positive electrode and the number of cycles.

Under different chemical systems (that is, current collectors 11a of a positive electrode plate and a negative electrode plate are of different types), there is an influence of the depth d of a lithium replenishing hole 13a on the number of cycles of the battery 100.

Comparative Example 2

This example is basically the same as Comparative example 1, at least except that in a negative electrode plate, a proportion P of hole areas of lithium replenishing holes 13a per unit area is recorded as 50%; and a case depth d of each of lithium replenishing holes 13a corresponding to a second distribution region 14b is designed as 5 μm, and a case depth d of each of lithium replenishing holes 13a corresponding to a first distribution region 14a is designed as 4 μm.

Comparative Example 3

This example is basically the same as Comparative example 2, at least except that a case depth d of each of lithium replenishing holes 13a corresponding to a second distribution region 14b is designed as 20 μm, and a case depth d of each of lithium replenishing holes 13a corresponding to a first distribution region 14a is designed as 10 μm.

Comparative Example 4

This example is basically the same as Comparative example 1, at least except that in a negative electrode plate, a current collector 11a of a negative electrode is low silicon.

Comparative Example 5

This example is basically the same as Comparative example 1, at least except that in a negative electrode plate, a current collector 11a of a negative electrode is graphite.

Comparative Example 6

This example is basically the same as Comparative example 1, at least except that in a positive electrode plate, a current collector 11a of a positive electrode is LFP (LiFePO4).

Example 4

This example is basically the same as Example 3, at least except that in a negative electrode plate, a proportion P of hole areas of lithium replenishing holes 13a per unit area is recorded as 30%; and a case depth d of each of lithium replenishing holes 13a corresponding to a second distribution region 14b is designed as 15 μm, and a case depth d of each of lithium replenishing holes 13a corresponding to a first distribution region 14a is designed as 10.5 μm.

Example 5

This example is basically the same as Example 3, at least except that in a negative electrode plate, a proportion P of hole areas of lithium replenishing holes 13a per unit area is recorded as 10%; and a case depth d of each of lithium replenishing holes 13a corresponding to a second distribution region 14b is designed as 40 and a case depth d of each of lithium replenishing holes 13a corresponding to a first distribution region 14a is designed as 31 μm.

Example 6

This example is basically the same as Example 3, at least except that in a negative electrode plate, a proportion P of hole areas of lithium replenishing holes 13a per unit area is recorded as 70%; and a case depth d of each of lithium replenishing holes 13a corresponding to a second distribution region 14b is designed as 7 μm, and a case depth d of each of lithium replenishing holes 13a corresponding to a first distribution region 14a is designed as 4.5 μm.

Example 7

This example is basically the same as Example 3, at least except that an average weight $M_A$ of active materials per unit area in a first distribution region 14a of an edge of a negative electrode is 0.0068 g/cm², an average weight $M_A$ of active materials per unit area in a second distribution region 14b of the edge of the negative electrode is 0.0090 g/cm², a case depth d of each of lithium replenishing holes 13a corresponding to the second distribution region 14b is designed as 5 μm, and a case depth d of each of lithium replenishing holes 13a corresponding to the first distribution region 14a is designed as 1.0 μm.

Example 8

This example is basically the same as Example 3, at least except that an average weight $M_A$ of active materials per unit area in a first distribution region 14a of an edge of a negative electrode is 0.0120 g/cm², an average weight $M_A$ of active materials per unit area in a second distribution region 14b of the edge of the negative electrode is 0.0150 g/cm², a case depth d of each of lithium replenishing holes 13a corresponding to the second distribution region 14b is designed as 25 μm, and a case depth d of each of lithium replenishing holes 13a corresponding to the first distribution region 14a is designed as 20.0 μm.

Example 9

This example is basically the same as Comparative example 4, at least except that in a negative electrode plate, a proportion P of hole areas of lithium replenishing holes 13a per unit area is recorded as 50%, a case depth d of each of lithium replenishing holes 13a corresponding to a second distribution region 14b is designed as 8 μm, and a case depth d of each of lithium replenishing holes 13a corresponding to a first distribution region 14a is designed as 5.0 μm.

Example 10

This example is basically the same as Comparative example 5, at least except that in a negative electrode plate, a proportion P of hole areas of lithium replenishing holes 13a per unit area is recorded as 50%, a case depth d of each of lithium replenishing holes 13a corresponding to a second distribution region 14b is designed as 7 μm, and a case depth d of each of lithium replenishing holes 13a corresponding to a first distribution region 14a is designed as 4.0 μm.

Example 11

This example is basically the same as Comparative example 6, at least except that in a negative electrode plate, a proportion P of hole areas of lithium replenishing holes 13a per unit area is recorded as 50%, a case depth d of each of lithium replenishing holes 13a corresponding to a second distribution region 14b is designed as 4.0 μm, and a case depth d of each of lithium replenishing holes 13a corresponding to a first distribution region 14a is designed as 3.0 μm.

Some parameters of Examples and Comparative examples are as shown in Table 2-1 and Table 2-2 below.

Batteries 100 prepared in Comparative examples and Examples above are tested for cycle performance at normal temperature, and results are as shown in Table 2-2.

TABLE 2-1

| | | Positive electrode | | | | Negative electrode | | | |
|---|---|---|---|---|---|---|---|---|---|
| Case number | Chemical system | Initial efficiency C | Gram capacity of charging $C_C$ | $M_C$ in second distribution region, g/cm² | $M_C$ in first distribution region, g/cm² | Initial efficiency A | Gram capacity of charging $C_A$ | $M_A$ in second distribution region, g/cm² | $M_A$ in first distribution region, g/cm² |
| Comparative example 1 | NCM/high silicon | 90.0% | 220 | 0.0300 | 0.0240 | 80% | 800 | 0.0100 | 0.0075 |
| Comparative example 2 | NCM/high silicon | 90.0% | 220 | 0.0300 | 0.0240 | 80% | 800 | 0.0100 | 0.0075 |
| Comparative example 3 | NCM/high silicon | 90.0% | 220 | 0.0300 | 0.0240 | 80% | 800 | 0.0100 | 0.0075 |
| Comparative example 4 | NCM/low silicon | 90.0% | 220 | 0.0300 | 0.0240 | 87% | 500 | 0.0160 | 0.0128 |
| Comparative example 5 | NCM/graphite | 90.0% | 220 | 0.0300 | 0.0240 | 94% | 375 | 0.0210 | 0.0168 |
| Comparative example 6 | LFP/graphite | 96.0% | 160 | 0.0300 | 0.0240 | 94% | 375 | 0.0150 | 0.0120 |
| Example 3 | NCM/high silicon | 90.0% | 220 | 0.0300 | 0.0240 | 80% | 800 | 0.0100 | 0.0075 |
| Example 4 | NCM/high silicon | 90.0% | 220 | 0.0300 | 0.0240 | 80% | 800 | 0.0100 | 0.0075 |
| Example 5 | NCM/high silicon | 90.0% | 220 | 0.0300 | 0.0240 | 80% | 800 | 0.0100 | 0.0075 |
| Example 6 | NCM/high silicon | 90.0% | 220 | 0.0300 | 0.0240 | 80% | 800 | 0.0100 | 0.0075 |

TABLE 2-1-continued

| | | Positive electrode | | | | Negative electrode | | | |
|---|---|---|---|---|---|---|---|---|---|
| Case number | Chemical system | Initial efficiency C | Gram capacity of charging $C_C$ | $M_C$ in second distribution region, g/cm² | $M_C$ in first distribution region, g/cm² | Initial efficiency A | Gram capacity of charging $C_A$ | $M_A$ in second distribution region, g/cm² | $M_A$ in first distribution region, g/cm² |
| Example 7 | NCM/high silicon | 90.0% | 220 | 0.0300 | 0.0240 | 80% | 800 | 0.0090 | 0.0068 |
| Example 8 | NCM/high silicon | 90.0% | 220 | 0.0300 | 0.0240 | 80% | 800 | 0.0150 | 0.0120 |
| Example 9 | NCM/low silicon | 90.0% | 220 | 0.0300 | 0.0240 | 87% | 500 | 0.0160 | 0.0128 |
| Example 10 | NCM/graphite | 90.0% | 220 | 0.0300 | 0.0240 | 94% | 375 | 0.0210 | 0.0168 |
| Example 11 | LFP/graphite | 96.0% | 160 | 0.0300 | 0.0240 | 94% | 375 | 0.0150 | 0.0120 |

From Table 2-2, it can be learned that through comparison between Example 3 to Example 6 and Comparative example 2, under the same chemical system, when the hole depths d of the lithium replenishing holes 13a satisfy both of the above two inequations and are changed with different thicknesses in different distribution regions 14, an increase in the proportion P of the hole areas of the lithium replenishing holes 13a per unit area has a slight influence on the exertion of the gram capacity of the positive electrode (that is, the gram capacity of the positive electrode is fully exerted to its limit, which will not be further improved); however, there will be an increase in the number of cycles, which can prolong the cycle life of the battery 100.

Through comparison between Example 7 to Example 8 and Comparative example 3, it can be learned that when the hole depth of a lithium replenishing hole 13a cannot satisfy both of the above two inequations, the depth d of the lithium replenishing hole 13a needs to be preferentially controlled to be less than or equal to $$\frac{C_A \times M_A - C_C \times M_C}{3860 \times 0.534 \times (1 \times P)} \times 10000.$$

Moreover, by increasing the average weight $M_A$ of the active materials per unit area of the negative electrode, the hole depth d can be adjusted to satisfy both of the above two inequations, and the exertion of the gram capacity of the positive electrode and the number of cycles will be significantly improved.

From Example 9 and Comparative example 4, Example 10 and Comparative example 5, and Example 11 and Comparative example 6, it can be learned that, under any chemical system, when the depths d of the lithium replenishing holes 13a satisfy both of the above two inequations and are changed in a positively correlated manner with the thicknesses of the active layer 12 of the negative electrode in different distribution regions 14, the number of cycles of the battery 100 will be significantly increased, which can effectively prolong the cycle life of the battery 100.

TABLE 2-2

| Case number | Chemical system | Proportion P of hole areas | Optional depth d/μm of large region | | | Optional depth d/μm of thinned region | | | Exertion of gram capacity of positive electrode, mAh/g | Number of cycles corresponding to capacity retention rate 80% |
|---|---|---|---|---|---|---|---|---|---|---|
| | | | Minimum | Maximum | Case hole depth | Minimum | Maximum | Case hole depth | | |
| Comparative example 1 | NCM/high silicon | 0% | 0.0 | 0.0 | 0.0 | 0.0 | 0.0 | 0.0 | 166.7 | 330 |
| Comparative example 2 | NCM/high silicon | 50% | 7.8 | 13.6 | 5.0 | 5.8 | 7.0 | 4.0 | 195.2 | 400 |
| Comparative example 3 | NCM/high silicon | 50% | 7.8 | 13.6 | 20.0 | 5.8 | 7.0 | 10.0 | 202.0 | 120 |
| Comparative example 4 | NCM/low silicon | 0% | 0.0 | 0.0 | 0.0 | 0.0 | 0.0 | 0.0 | 185.3 | 950 |
| Comparative example 5 | NCM/graphite | 0% | 0.0 | 0.0 | 0.0 | 0.0 | 0.0 | 0.0 | 202.3 | 1200 |
| Comparative example 6 | LFP/graphite | 0% | 0.0 | 0.0 | 0.0 | 0.0 | 0.0 | 0.0 | 143.8 | 3000 |
| Example 3 | NCM/high silicon | 50% | 7.8 | 13.6 | 10.0 | 5.8 | 7.0 | 6.5 | 202.4 | 720 |
| Example 4 | NCM/high silicon | 30% | 12.9 | 22.6 | 15.0 | 9.7 | 11.6 | 10.5 | 202.0 | 680 |
| Example 5 | NCM/high silicon | 10% | 38.8 | 67.9 | 40.0 | 29.1 | 34.9 | 31.0 | 201.6 | 610 |
| Example 6 | NCM/high silicon | 70% | 5.5 | 9.7 | 7.0 | 4.2 | 5.0 | 4.5 | 203.1 | 750 |

TABLE 2-2-continued

| | | Proportion P of hole areas | Optional depth d/μm of large region | | | Optional depth d/μm of thinned region | | | Exertion of gram capacity of positive electrode, mAh/g | Number of cycles corresponding to capacity retention rate 80% |
|---|---|---|---|---|---|---|---|---|---|---|
| Case number | Chemical system | | Minimum | Maximum | Case hole depth | Minimum | Maximum | Case hole depth | | |
| Example 7 | NCM/high silicon | 50% | 7.0 | 5.8 | 5.0 | 5.2 | 1.2 | 1.0 | 197.1 | 460 |
| Example 8 | NCM/high silicon | 50% | 11.6 | 52.4 | 25.0 | 9.3 | 41.9 | 20.0 | 202.8 | 1080 |
| Example 9 | NCM/low silicon | 50% | 2.3 | 13.6 | 8.0 | 1.9 | 10.9 | 5.0 | 202.6 | 1220 |
| Example 10 | NCM/graphite | 50% | −3.1 | 12.4 | 7.0 | −2.4 | 9.9 | 4.0 | 202.4 | 1700 |
| Example 11 | LFP/graphite | 50% | 1.1 | 8.0 | 4.0 | 0.9 | 6.4 | 3.0 | 148.8 | 3500 |

According to some embodiments of the present application, the present application provides an electrode assembly, including a positive electrode plate, a negative electrode plate, and a separator disposed between the positive electrode plate and the negative electrode plate. The positive electrode plate and/or the negative electrode plate is an electrode plate 10 in any one of the above solutions.

According to some embodiments of the present application, the present application provides a secondary battery 100. The battery 100 includes an electrode assembly in the above solution.

According to some embodiments of the present application, the present application provides a power consuming device, including a secondary battery 100 in the above solution.

According to some embodiments of the present application, the present application further provides a long-lifespan negative electrode and battery 100. The quantitative and precise lithium replenishment is implemented, and the lithium replenishing amount is effectively controlled to prevent reverse connection between positive and negative electrodes. A specific implementation is as follows:
1: carrying out coating and cold pressing on single-sided negative electrode plates;
2: providing holes of different depths in different regions in each single-sided negative electrode plate by means of laser drilling, rolling screw puncturing, etc.;
3: directionally depositing lithium metal in the holes by means of lithium ribbon calendering or magnetron sputtering deposition; and
4: stacking or winding the above negative electrode plates in sequence of "a positive electrode/an isolation film/a single-sided negative electrode plate/a single-sided negative electrode plate/an isolation film/a positive electrode" to form a battery 100, where sides, provided with the holes for lithium replenishment, of every two single-sided negative electrode plates are assembled in an attached manner, and sides of negative electrode active materials face the isolation film.

To implement precise lithium replenishment control, the hole depths d in different regions of the negative electrode plate are designed to satisfy the following relationship:

$$d \geq \frac{(C.E._C - C.E._A) \times C_A \times M_A}{3860 * 0.534 * (1 * P)} \qquad \text{inequation 1-1}$$

When the hole depths d satisfy a minimum of the inequation 1-1, the lithium replenishing holes 13a are filled with lithium metal, which can fully exert the gram capacity of the positive electrode, thus effectively increasing the energy density. With a further increase in the hole depths d, the lithium replenishing amount increases. The gram capacity of the positive electrode is fully exerted to its limit, which will not be further improved, but the cycle life can be effectively prolonged.

Moreover, to avoid lithium precipitation of a negative electrode side in a cycle process due to excessive lithium replenishment, the hole depths d in different regions of the negative electrode plate are designed to satisfy the following relationship:

$$d \leq \frac{C_A \times M_A - C_C \times M_C}{3860 \times 0.534 \times (1 \times P)} \times 10000 \qquad \text{inequation 1-2}$$

The hole depths d need to satisfy both of the inequation 1-1 and the inequation 1-2. When both of the inequation 1-1 and the inequation 1-2 cannot be satisfied, the hole depths d need to preferentially satisfy the inequation 1-2, so as to avoid safety risks caused by lithium precipitation. In addition, by increasing average weights $M_A$ of active materials per unit area of the negative electrode, the hole depths d can be adjusted to meet both of the inequation 1-1 and the inequation 1-2.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. An electrode plate, comprising:
a current collection structure; and
two active layers respectively arranged on two opposite side surfaces of the current collection structure along a thickness direction of the current collection structure, wherein a plurality of lithium replenishing spaces used to communicate with one of the active layers on one side are arranged on the current collection structure, and the lithium replenishing spaces accommodate lithium replenishing agents, wherein
in distribution regions on the active layer communicating with the lithium replenishing spaces, average weights of active materials per unit area of the active layer are denoted as $M_A$, sums of internal volumes of the lithium replenishing spaces that are covered by projections of the distribution regions along the thickness direction of the current collection structure are denoted as V0, and the distribution regions comprise at least a first distribution region and a second distribution region; and
$M_A$ in the first distribution region is less than $M_A$ in the second distribution region, and corresponding V0 in the first distribution region is less than corresponding V0 in the second distribution region.

2. The electrode plate according to claim 1, wherein a depth of each of the lithium replenishing spaces is denoted as d, and a thickness of each of the active layers corresponding to positions of the lithium replenishing spaces is denoted as h; and
h in the first distribution region is less than h in the second distribution region, and corresponding d in the first distribution region is less than corresponding d in the second distribution region.

3. The electrode plate according to claim 2, wherein the depth d of each of the lithium replenishing spaces satisfies the following relationship:

$$d \leq \frac{C_A \times M_A - C_C \times M_C}{3860 \times 0.534 \times (1 \times P)} \times 10000,$$

wherein
$C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm², and P is a proportion of opening areas of all lithium replenishing spaces per unit area on the current collection structure, wherein, optionally, the proportion P of the opening areas of all the lithium replenishing spaces per unit area satisfies the following relationship: 10%≤P≤50%.

4. The electrode plate according to claim 2, wherein the depth d of each of the lithium replenishing spaces satisfies the following relationship:

$$d \geq \frac{(C.E._C - C.E._A) \times C_A \times M_A}{3860 * 0.534 * (1 * P)} \times 10000,$$

wherein
$C.E._C$ is an initial coulombic efficiency of the positive electrode active material, $C.E._A$ is an initial coulombic efficiency of the negative electrode active material, and $C_A$ is the initial lithium intercalation capacity of the negative electrode active material in mAh/g;
and/or
wherein the lithium replenishing spaces are arranged at intervals in one of the active layers on at least one side, and any adjacent two of the lithium replenishing spaces have an equal spacing.

5. The electrode plate according to claim 1, wherein the current collection structure comprises at least one current collector along the thickness direction of the current collection structure, the lithium replenishing spaces penetrating through at least one of current collectors provided with the active layers.

6. The electrode plate according to claim 5, wherein the current collection structure comprises two current collectors, the two active layers are respectively disposed on two side surfaces, facing away from each other, of the two current collectors, and the lithium replenishing spaces penetrate through each of the two current collectors, wherein, optionally, the current collection structure further comprises at least one lithium replenishing layer, and the lithium replenishing layer is located between the two current collectors.

7. The electrode plate according to claim 1, wherein the lithium replenishing spaces are lithium replenishing holes, and the lithium replenishing holes extend into one of the active layers on either side along the thickness direction of the current collection structure.

8. The electrode plate according to claim 1, wherein the first distribution region extends around a periphery of the second distribution region.

9. A method for manufacturing an electrode plate, comprising the following steps:
step S100: providing two single-sided electrode plates, wherein each of the single-sided electrode plates comprises a current collector and an active layer disposed on one side of the current collector;
step S200: providing lithium replenishing holes extending into the active layer in the current collector on at least one of the single-sided electrode plates, and controlling average weights $M_A$ of active materials per unit area in at least two distribution regions on the active layer and sums V0 of internal volumes of corresponding lithium replenishing holes to satisfy: $M_A$ in a first distribution region being less than $M_A$ in a second distribution region, and corresponding V0 in the first distribution region being less than corresponding V0 in the second distribution region, wherein the distribution regions comprise the first distribution region and the second distribution region;
step S300: depositing lithium replenishing agents in the lithium replenishing holes; and
step S400: attaching side surfaces, facing away from the active layers, of the two single-sided electrode plates to each other.

10. The method for manufacturing an electrode plate according to claim 9, wherein step S200 comprises:
step S210: obtaining thicknesses h of the active layer in different distribution regions;
step S220: uniformly providing the plurality of lithium replenishing holes in the current collector; and
step S230: controlling depths d of lithium replenishing holes in a projection region of each of the distribution regions on the current collector, such that h in the first distribution region is less than h in the second distribution region, and corresponding d in the first distribution region is less than corresponding d in the second distribution region.

11. The method for manufacturing an electrode plate according to claim 10, wherein the depth d of each of the lithium replenishing holes satisfies the following relationship:

$$d \leq \frac{C_A \times M_A - C_C \times M_C}{3860 \times 0.534 \times (1 \times P)} \times 10000,$$

wherein $C_A$ is an initial lithium intercalation capacity of a negative electrode active material in mAh/g, $C_C$ is an initial lithium deintercalation capacity of a positive electrode active material in mAh/g, $M_C$ is an average weight of active materials per unit area of a positive electrode in g/cm², and P is a proportion of hole areas of all lithium replenishing holes per unit area on the current collection structure.

12. The method for manufacturing an electrode plate according to claim 10, wherein the depth d of each of the lithium replenishing holes satisfies the following relationship:

$$d \geq \frac{(C.E._C - C.E._A) \times C_A \times M_A}{3860 * 0.534 * (1 * P)} \times 10000,$$

wherein $C.E._C$ is an initial coulombic efficiency of the positive electrode active material, $C.E._A$ is an initial coulombic efficiency of the negative electrode active material, and $C_A$ is the initial lithium intercalation capacity of the negative electrode active material in mAh/g.

13. An electrode assembly, comprising a positive electrode plate, a negative electrode plate, and a separator disposed between the positive electrode plate and the negative electrode plate, wherein the positive electrode plate and/or the negative electrode plate are/is the electrode plate according to claim 1.

14. A secondary battery, comprising the electrode assembly according to claim 13.

15. A power consuming device, comprising the secondary battery according to claim 14.

* * * * *